(12) United States Patent
Mills et al.

(10) Patent No.: US 8,649,160 B2
(45) Date of Patent: Feb. 11, 2014

(54) PLUG-IN CIRCUIT BREAKER ASSEMBLY INCLUDING INSULATIVE RETAINERS

(75) Inventors: Patrick W. Mills, Bradenton, FL (US); James M. McCormick, Bradenton, FL (US); Richard G. Benshoff, Sarasota, FL (US)

(73) Assignee: Eaton Corporation, Cleveland, OH (US)

( * ) Notice: Subject to any disclaimer, the term of this patent is extended or adjusted under 35 U.S.C. 154(b) by 200 days.

(21) Appl. No.: 13/367,700

(22) Filed: Feb. 7, 2012

(65) Prior Publication Data

US 2013/0201608 A1 Aug. 8, 2013

(51) Int. Cl.
*H02B 1/14* (2006.01)

(52) U.S. Cl.
USPC ............. 361/636; 361/634; 174/59; 439/147; 439/278; 439/588

(58) Field of Classification Search
USPC .................. 361/634, 636; 174/59; 200/50.31; 439/76.1–76.2, 147, 278, 587–589
See application file for complete search history.

(56) References Cited

U.S. PATENT DOCUMENTS

| 3,585,456 | A | 6/1971 | Phillips, Jr. |
| 3,767,977 | A | 10/1973 | Bachman |
| 3,880,487 | A | 4/1975 | Goodman et al. |
| 4,157,582 | A | 6/1979 | Myers |
| 4,204,245 | A | 5/1980 | Luke et al. |
| 4,491,897 | A | 1/1985 | Troebel |
| 4,744,003 | A | 5/1988 | Koslosky et al. |
| 4,940,421 | A | * 7/1990 | Kano et al. ..................... 439/273 |
| 5,466,974 | A | 11/1995 | Sutrina et al. |
| 5,612,579 | A | 3/1997 | Wisbey et al. |
| 5,859,580 | A | * 1/1999 | Hashizawa et al. ........... 337/260 |
| 6,039,581 | A | 3/2000 | DiMarco |
| 6,086,388 | A | 7/2000 | Sloey et al. |

(Continued)

FOREIGN PATENT DOCUMENTS

| EP | 1148530 A1 | * 10/2001 | ............. H01H 73/06 |
| EP | 1507275 A1 | * 2/2005 | ............. H01H 73/08 |
| EP | 2 254 207 A1 | 11/2010 | |
| GB | 2 347 280 A | 8/2000 | |

OTHER PUBLICATIONS

European Patent Office, "International Search Report and Written Opinion", Mar. 14, 2013, 9 pp.

*Primary Examiner* — Robert J Hoffberg
(74) *Attorney, Agent, or Firm* — Eckert Seamans Cherin & Mellott, LLC; Kirk D. Houser (57) ABSTRACT

A circuit breaker assembly includes a housing, an electrical bus structure within the housing, a number of first plug-in members coupled to the bus structure, and a number of insulative retainers coupled to the bus structure. A corresponding one of the number of insulative retainers is operatively associated with a corresponding number of the number of first plug-in members. Each of a number of circuit breakers includes a manual operator and a number of second plug-in members disposed opposite the manual operator. The number of second plug-in members electrically engage a number of the number of first plug-in members. The corresponding one of the number of insulative retainers is disposed about the corresponding number of the number of first plug-in members, in order to insulate the corresponding number of the number of first plug-in members, and to retain the number of second plug-in members.

21 Claims, 6 Drawing Sheets

(56) References Cited

U.S. PATENT DOCUMENTS

| | | | | |
|---|---|---|---|---|
| 6,094,361 | A | 7/2000 | Batten, Jr. et al. | |
| 6,146,788 | A | 11/2000 | Ikeda et al. | |
| 6,313,980 | B1 | 11/2001 | Craft et al. | |
| 6,315,580 | B1 | 11/2001 | Hurtubise et al. | |
| 6,414,245 | B1 | 7/2002 | Lopp et al. | |
| 6,431,894 | B1 | 8/2002 | Boiret et al. | |
| 6,456,203 | B1 | 9/2002 | Schomaker et al. | |
| 6,560,123 | B1 | 5/2003 | de Varennes et al. | |
| 6,773,285 | B2 * | 8/2004 | Bernat et al. | 439/246 |
| 6,870,729 | B2 | 3/2005 | Johnsen et al. | |
| 6,974,333 | B2 | 12/2005 | Wildes et al. | |
| 7,052,313 | B2 | 5/2006 | Gorman | |
| 7,270,575 | B2 | 9/2007 | Krantz, Jr. et al. | |
| 7,276,436 | B2 | 10/2007 | Kawai et al. | |
| 7,338,331 | B2 | 3/2008 | Yoon | |
| 7,393,248 | B2 | 7/2008 | Best et al. | |
| 7,837,496 | B1 | 11/2010 | Pal | |
| 7,889,480 | B2 | 2/2011 | Latham | |
| 8,094,436 | B2 * | 1/2012 | Mills et al. | 361/636 |
| 8,328,575 | B2 * | 12/2012 | Meux et al. | 439/349 |
| 8,445,800 | B2 * | 5/2013 | Mills et al. | 200/304 |
| 8,488,302 | B2 * | 7/2013 | Mills et al. | 361/636 |
| 8,514,552 | B2 * | 8/2013 | Mills et al. | 361/644 |
| 2006/0152312 | A1 | 7/2006 | Stanke et al. | |
| 2007/0108963 | A1 | 5/2007 | Wavering et al. | |
| 2007/0271403 | A1 | 11/2007 | Kojori | |
| 2008/0160796 | A1 | 7/2008 | Diessner et al. | |
| 2009/0130918 | A1 | 5/2009 | Nguyen et al. | |
| 2009/0184574 | A1 | 7/2009 | Zavidniak et al. | |
| 2009/0269948 | A1 | 10/2009 | Nemoz et al. | |
| 2009/0273234 | A1 | 11/2009 | Wavering et al. | |
| 2009/0325407 | A1 | 12/2009 | Nguyen et al. | |
| 2010/0296229 | A1 | 11/2010 | Meux et al. | |
| 2011/0034058 | A1 | 2/2011 | Riedel et al. | |

* cited by examiner

PLUG-IN CIRCUIT BREAKER ASSEMBLY INCLUDING INSULATIVE RETAINERS

BACKGROUND

1. Field

The disclosed concept pertains generally to circuit breakers and, more particularly, to circuit breaker assemblies, such as, for example, circuit breaker panels for a number of circuit breakers.

2. Background Information

Circuit breakers are used, for example, in aircraft electrical systems where they not only provide overcurrent protection but also serve as switches for turning equipment on and off. Aircraft or subminiature circuit breakers, for instance, are typically relatively small to accommodate the relatively high-density layout of aircraft circuit breaker panels, which make circuit breakers for numerous circuits accessible to a user. Aircraft electrical systems can consist, for example, of hundreds of circuit breakers, each of which is used for a circuit protection function as well as a circuit disconnection function through a push-pull handle.

The circuit breaker push-pull handle is moved from in-to-out in order to open the corresponding load circuit. This action may be either manual or, else, automatic in the event of an overload or fault condition. If the push-pull handle is moved from out-to-in, then the load circuit is re-energized. If the load circuit had been automatically de-energized, then the out-to-in operation of the push-pull handle corresponds to a circuit breaker reset action.

Such circuit breakers typically include a threaded bezel. A suitable fastener, such as a nut and washer, mount the circuit breaker at a corresponding opening of an aircraft circuit breaker mounting panel. The push-pull handle passes through the bezel to the user side of the mounting panel. The circuit breaker also typically includes line and load screw terminals disposed on the opposite maintenance side of the mounting panel.

U.S. Pat. No. 8,094,436 discloses a circuit breaker assembly, such as a plug-in circuit breaker panel, including a housing, an electrical bus structure coupled to the housing, and a number of first plug-in members coupled to the electrical bus structure. A number of circuit breakers include a first surface and a second plug-in member disposed opposite the first surface. The second plug-in member of each of the number of circuit breakers is mated with a corresponding one of the number of first plug-in members. A plate member is removably coupled to the housing. The plate member includes a first surface and an opposite second surface. The first surface of the number of circuit breakers engages the opposite second surface of the plate member in order to maintain mating of each of the number of circuit breakers with the corresponding one of the number of first plug-in members.

If the plug-in circuit breaker panel is desired to be mounted in an overhead configuration with the push-pull operating handle of the circuit breakers being disposed generally downward, then a retention problem of the plug-in circuit breakers may result if the plate member, such as a face plate or cover member, is removed, for example, for maintenance or problem diagnosis or correction.

There is room for improvement in circuit breaker assemblies.

SUMMARY

These needs and others are met by embodiments of the disclosed concept in which a number of insulative retainers is disposed about a corresponding number of a number of first plug-in members, in order to insulate the corresponding number of the number of first plug-in members, and to retain a number of second plug-in members of a number of circuit breakers that electrically engage the corresponding number of the number of first plug-in members.

In accordance with one aspect of the disclosed concept, a circuit breaker assembly comprises: a housing; an electrical bus structure within the housing; a number of first plug-in members coupled to the electrical bus structure; a number of insulative retainers coupled to the electrical bus structure, a corresponding one of the number of insulative retainers being operatively associated with a corresponding number of the number of first plug-in members; and a number of circuit breakers, each of the number of circuit breakers comprising a manual operator and a number of second plug-in members disposed opposite the manual operator, the number of second plug-in members electrically engaging a number of the number of first plug-in members, wherein the corresponding one of the number of insulative retainers is disposed about the corresponding number of the number of first plug-in members, in order to insulate the corresponding number of the number of first plug-in members, and to retain the number of second plug-in members electrically engaging the corresponding number of the number of first plug-in members.

The corresponding one of the number of insulative retainers may be structured to protect the corresponding number of the number of first plug-in members when not electrically engaging the number of second plug-in members.

Each of the number of first plug-in members may be a number of male terminals; the number of second plug-in members may be a number of female sockets; each of the number of insulative retainers may comprise, for one of the number of male terminals and one of the number of female sockets, an insulator comprising a base and an elongated portion extending from the base, the base having a first aperture therein, the elongated portion having a second aperture therein and a conduit extending therethrough from the first aperture to the second aperture; and the one of the number of male terminals may extend through the first aperture and only partially through the conduit.

The conduit may have a generally cylindrical shape and comprise a plurality of internal ridges; and the one of the number of female sockets may have a cylindrical shape within the generally cylindrical shape of the conduit and be engaged by the internal ridges therein.

The number of insulative retainers may be structured to retain the number of circuit breakers with the manual operator generally facing downward.

As another aspect of the disclosed concept, a circuit breaker assembly comprises: a housing; an electrical bus structure within the housing; a number of first plug-in members coupled to the electrical bus structure; a number of insulative retainers coupled to the electrical bus structure, a corresponding one of the number of insulative retainers being operatively associated with a corresponding number of the number of first plug-in members; a number of circuit breakers, each of the number of circuit breakers comprising a manual operator disposed from a first surface and a number of second plug-in members disposed from a second surface opposite the first surface, the number of second plug-in members electrically engaging a number of the number of first plug-in members; and a cover member removably coupled to the housing, the cover member comprising a third surface and a number of apertures disposed through the third surface; wherein the corresponding one of the number of insulative retainers is disposed about the corresponding number of the number of first plug-in members, in order to insulate the corresponding number of the number of first plug-in members, and to retain the number of second plug-in members electrically engaging the corresponding number of the number of first plug-in members, wherein the first surface of the number of circuit breakers engages the third surface of the cover member, and wherein the manual operator passes through a corresponding one of the number of apertures.

The number of insulative retainers may be structured to retain the number of circuit breakers with the manual operator generally facing downward when the cover member is removed from the housing.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

As employed herein, the term "fastener" refers to any suitable connecting or tightening mechanism expressly including, but not limited to, screws, bolts, nuts (e.g., without limitation, lock nuts) and combinations thereof.

The disclosed concept is described in association with subminiature or aircraft circuit breakers, although the disclosed concept is applicable to a wide range of different circuit breakers for a wide range of different applications. Such circuit breakers can be employed, for example and without limitation, in aircraft alternating current (AC) systems having a typical frequency of about 400 Hz, but can also be used in direct current (DC) systems. It will also become evident that the disclosed concept is applicable to other types of circuit breaker panels including those used in AC systems operating at other frequencies; to larger circuit breakers, such as miniature residential or commercial circuit breakers; and to a wide range of circuit breaker applications, such as, for example, residential, commercial, industrial, aerospace, and automotive. As further non-limiting examples, both AC (e.g., without limitation, 120, 220, 480-600 VAC) operation at a wide range of frequencies (e.g., without limitation, 50, 60, 120, 400 Hz, and higher or lower frequencies) and DC operation (e.g., without limitation, 42 VDC) are possible.

Figure 1:
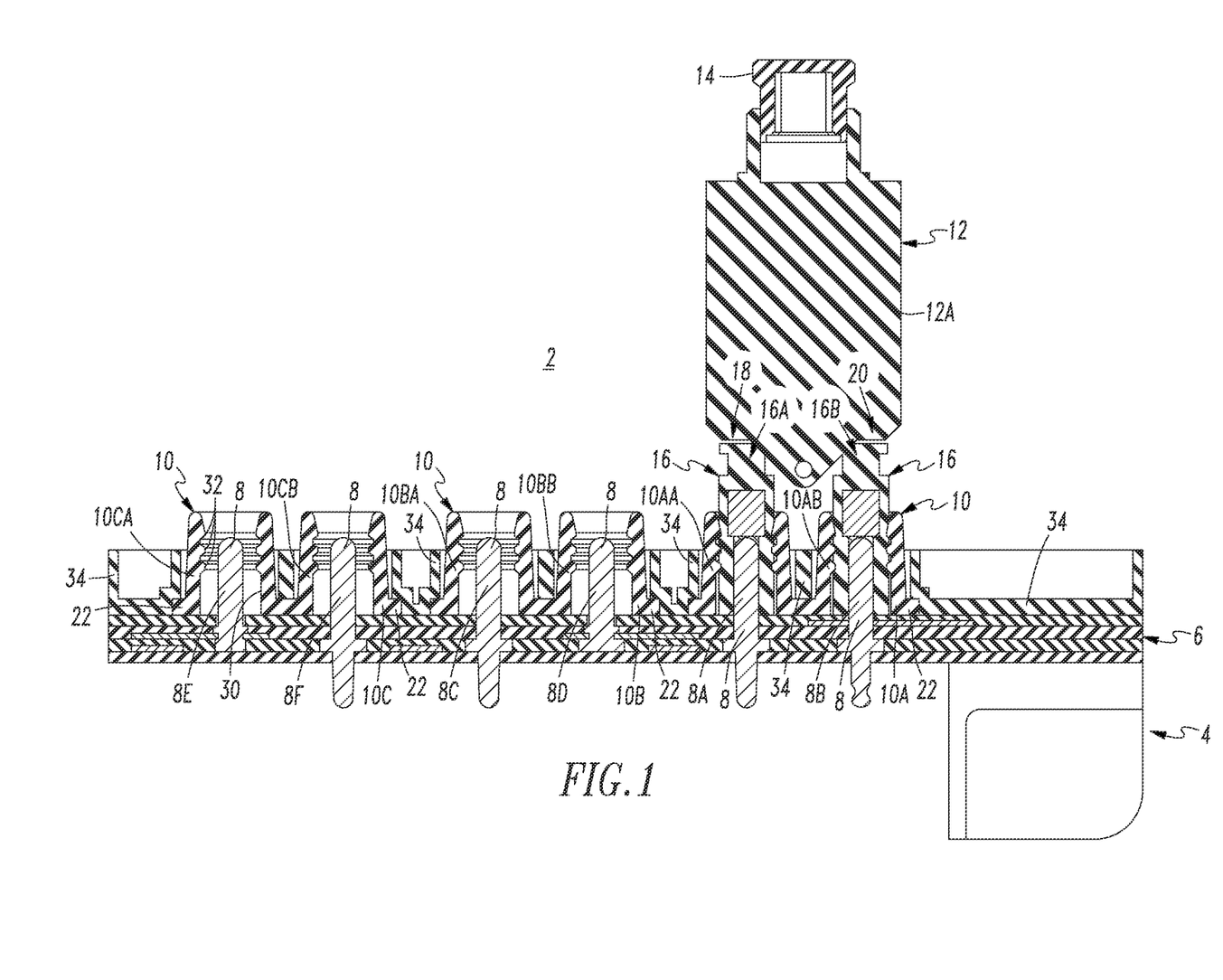
FIG. 1 is a cross-sectional view of a circuit breaker assembly in accordance with embodiments of the disclosed concept.

Referring to FIG. 1, a circuit breaker assembly, such as the example circuit breaker panel 2 is shown. The circuit breaker panel 2 includes a housing 4 (partially shown in FIG. 1), an electrical bus structure, such as the example multi-layer (e.g., without limitation, four conductive layers) backplane 6 within the housing 4, and a number of first plug-in members, such as the example pins 8 (six example pins 8 are shown, although any suitable number may be employed) coupled to the backplane 6. The circuit breaker panel 2 further includes a number of insulative retainers 10 (three example retainers 10 are shown for the six example pins 8, although any suitable number may be employed) are coupled to the backplane 6. A corresponding one of the number of insulative retainers 10, such as 10A, is operatively associated with a corresponding number of the number of pins 8, such as 8A and 8B). The circuit breaker panel 2 also includes a number of circuit breakers 12 (one example circuit breaker 12 is shown, although any suitable number may be employed).

Each of the number of circuit breakers 12 includes a manual operator 14 and a number of second plug-in members, such as the example sockets 16 (two example sockets 16A and 16B are shown, although any suitable number may be employed) disposed opposite the manual operator 14. The number of second sockets 16 electrically engage a number of the number of pins 8, as shown with pins 8A and 8B. The corresponding one 10A of the number of insulative retainers 10 is disposed about the corresponding number of the number of pins 8A and 8B, in order to insulate the corresponding number of the number of pins 8A and 8B, and to retain the number of sockets 16A and 16B electrically engaging the corresponding number of the number of pins 8A and 8B, respectively.

The example plug-in circuit breaker 12 includes the two example embedded plug-in sockets 16A and 16B, which are received by respective portions 10AA and 10AB of the insulative retainers 10A. The pins 8A and 8B electrically engage the sockets 16A and 16B within the portions 10AA and 10AB, respectively. This serves to retain the sockets 16A and 16B and, thus, the plug-in circuit breaker 12 for overhead applications and prevents the circuit breaker 12 from falling out (e.g., if a cover or faceplate (not shown, but see cover or faceplate 48 of FIG. 7) is removed). The insulative retainers 10 also provide electrical insulation between conductors (e.g., the pins 8A, 8B, 8C, 8D, 8E and 8F) for severe applications (e.g., by providing a moisture barrier), protects the pins (e.g., the pins 8C, 8D, 8E and 8F) in unused positions, and protects the user from electrical conductors (e.g., the pins 8C, 8D, 8E and 8F) in unused positions.

Figure 2:
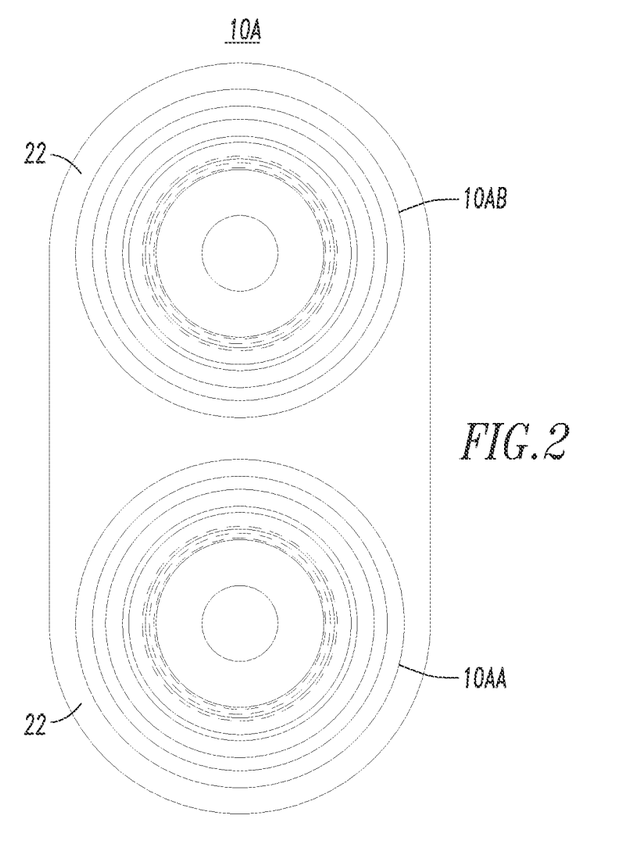
FIG. 2 is a plan view of one of the insulative retainers of FIG. 1.
Figure 3:
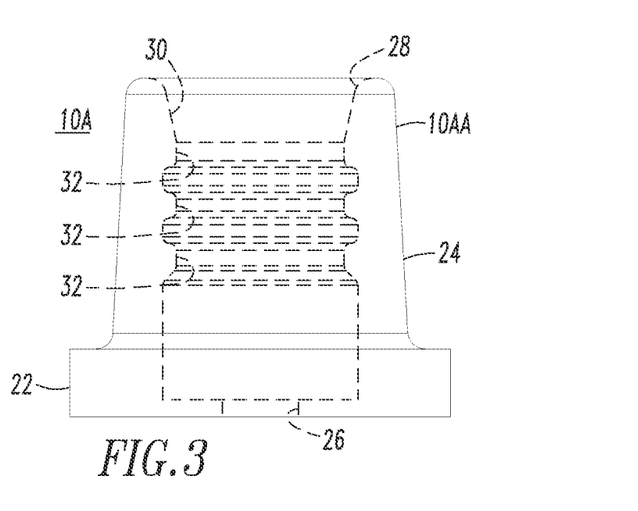
FIG. 3 is an end vertical elevation view of the insulative retainer of FIG. 2 with internal structures shown in hidden line drawing.
Figure 4:
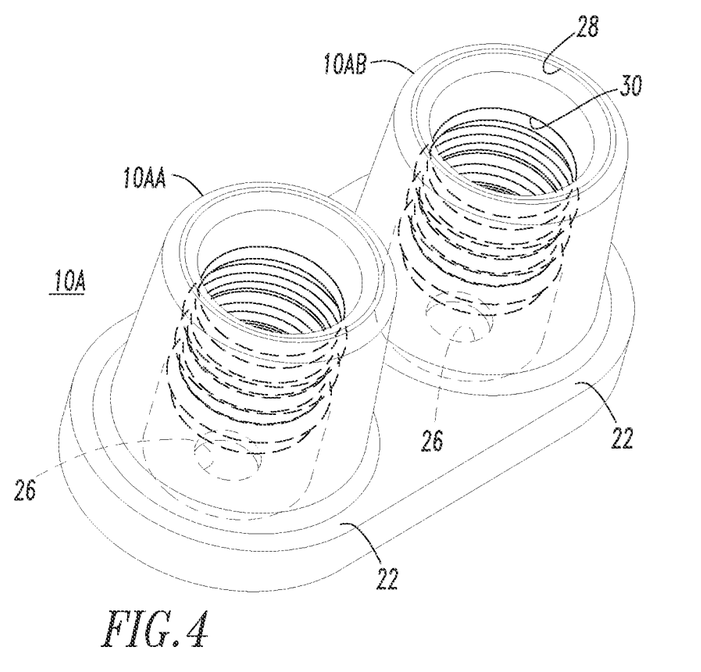
FIG. 4 is an isometric view of the insulative retainer of FIG. 2 with internal structures shown in hidden line drawing.

FIGS. 2-4 show one 10A of the insulative retainers 10 of FIG. 1 including the two example portions 10AA and 10AB. This provides a single insulative retainer for the two example pins 8A,8B for the example one-pole circuit breaker 12 that has a line terminal 18 and a load terminal 20.

EXAMPLE 1

As shown with the insulative retainers 10B,10C of FIG. 1, the insulative retainers 10 are structured to protect the corresponding pins 8C, 8D, 8E and 8F when they are not electrically engaging the sockets, such as 16A and 16B, of a plug-in circuit breaker, such as 12. As shown, the pins 8C, 8D, 8E and 8F are recessed within the portions 10BA, 10BB, 10CA, 10CB, respectively.

EXAMPLE 2

Each of the number of first plug-in members is a plurality of male terminals 8A-8B,8C-8D,8E-8F. The number of second plug-in members is a plurality of female sockets 16A-16B. Each of the number of insulative retainers 10A,10B,10C is operatively associated with a plurality of the plurality of male terminals, such as the pins 8A and 8B, and a plurality of the plurality of female sockets, such as the sockets 16A-16B, as shown with the circuit breaker 12 of FIG. 1.

EXAMPLE 3

As best shown with the insulative retainer 10A of FIGS. 2-4, the insulative retainers 10 (FIG. 1) include, for one of the two male terminals 8 and one of the two female sockets 16, an insulator, as shown by the portion 10AA or 10AB, having a base 22 and an elongated portion 24 extending from the base 22. The base 22 has a first aperture 26 therein. The elongated portion 24 has a second aperture 28 therein and a conduit 30 (shown in hidden line drawing in FIG. 3) extending therethrough from the first aperture 26 to the second aperture 28. A pin, such as 8A or 8B, extends through the first aperture 26, into and partially through the conduit 30. A female socket, such as 16A or 16B, extends through the second aperture 28 and partially through the conduit 30. The pin, such as 8A or 8B, electrically engages the female socket, such as 16A or 16B, within the conduit 30.

EXAMPLE 4

As best shown in FIGS. 1 and 3, the conduit 30 has a generally cylindrical shape and includes a plurality of internal ridges 32. The female socket, such as 16A or 16B, has a cylindrical shape within the generally cylindrical shape of the conduit 30 and is engaged by the internal ridges 32 therein. The internal ridges 32 within the insulative retainer portions 10AA,10AB are for retention and air-relief, as there is the need for a space for the air to go when inserting the circuit breaker sockets 16.

EXAMPLE 5

The insulative retainers 10 are preferably made from liquid silicone rubber (LSR). LSR is a high purity platinum-cure silicone. It is typically supplied in two parts with one of the parts containing a platinum catalyst. These two parts are mixed along with any desired colors and/or ingredients, and are extruded into the disclosed insulative retainer 10. Alternatively, the insulative retainers 10 can be made from a thermoplastic elastomer (TPE) or a transfer (thermoset) rubber molding.

EXAMPLE 6

The insulative retainers 10, as shown with 10A, are structured to retain the circuit breakers 12, as shown with 12A, with the manual operator 14 generally facing downward (e.g., upward with respect to FIG. 1).

EXAMPLE 7

As shown in FIG. 1, each of the insulative retainers 10 includes the base 22 and is coupled to the multi-layer backplane 6 by a keeper layer 34 engaging the bases 22. The keeper layer 34 is suitably coupled to the backplane 6. The keeper layer 34 is made of a thermally conductive thermoplastic or other suitable type of thermoplastic. The keeper layer 34 can be secured to the backplane 6 using a suitable adhesive (e.g., without limitation, a Bond-Ply® 660 adhesive layer marketed by The Bergquist Company of Chanhassen, Minn., or by a suitable fastener (e.g., without limitation, mechanical hardware; rivet) (not shown)).

EXAMPLE 8

FIG. 1 shows one insulative retainer 10A having two insulative portions 10AA,10AB for one single-pole circuit breaker 12 having two sockets 16A,16B. If a three-pole circuit breaker (not shown) is employed, then three of the example insulative retainers 10 are employed.

EXAMPLE 9

Figure 5:
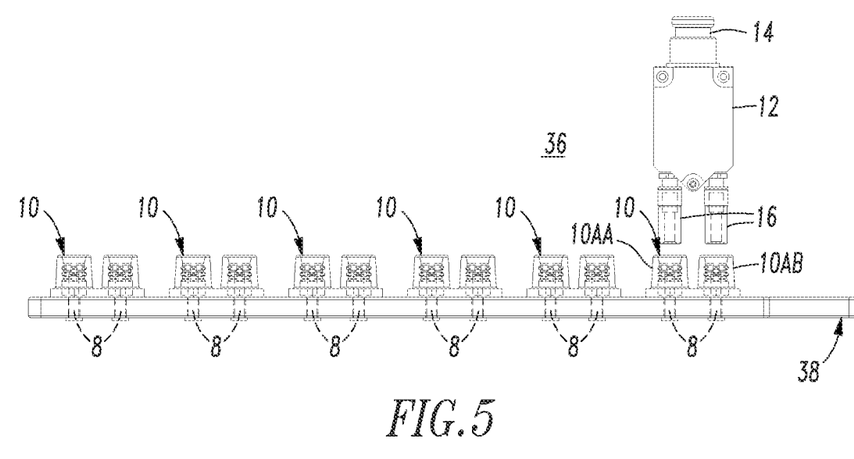
FIG. 5 is an exploded vertical elevation view of a circuit breaker assembly in accordance with another embodiment of the disclosed concept.
Figure 6:
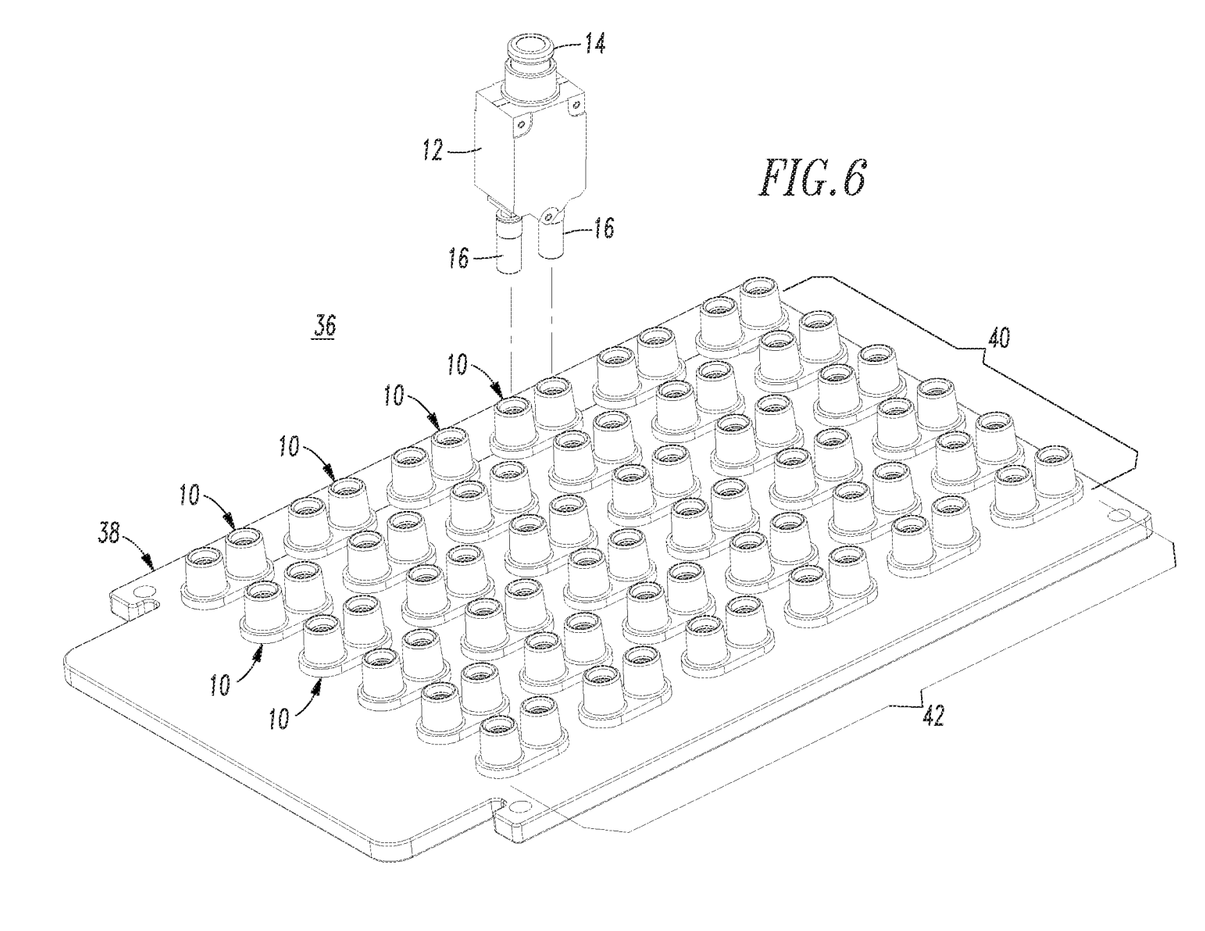
FIG. 6 is an exploded isometric view of the circuit breaker assembly of FIG. 5.

FIGS. 5 and 6 show another circuit breaker assembly, such as the example circuit breaker panel 36. The circuit breaker panel 36 can be the same as or similar to the circuit breaker panel 2 of FIG. 1 except that the example keeper layer 34 is not employed. Instead, the insulative retainers 10 are coupled to an electrical bus structure, such as the example multi-layer backplane 38, by a suitable adhesive to bond the retainers 10 thereto.

EXAMPLE 10

Although FIGS. 1, 5 and 6 show circuit breaker panels 2,36 where the insulative retainers 10 have two insulative portions, such as 10AA,10AB, for one single-pole circuit breaker 12, the disclosed concept is applicable to other insulative retainers in which one of the rows 40 or columns 42 of FIG. 6 is formed by a single insulative retainer (not shown) having relatively many insulative portions for multiple circuit breakers (not shown); the entire backplane 38 employs a single insulative retainer (not shown) having relatively very many insulative portions for all of the circuit breakers (not shown); a single insulative retainer (not shown) employs various insulative portions for all poles of a multi-pole circuit breaker (not shown); or a single insulative retainer (not shown) employs various insulative portions for multiple circuit breakers (not shown).

EXAMPLE 11

Figure 7:
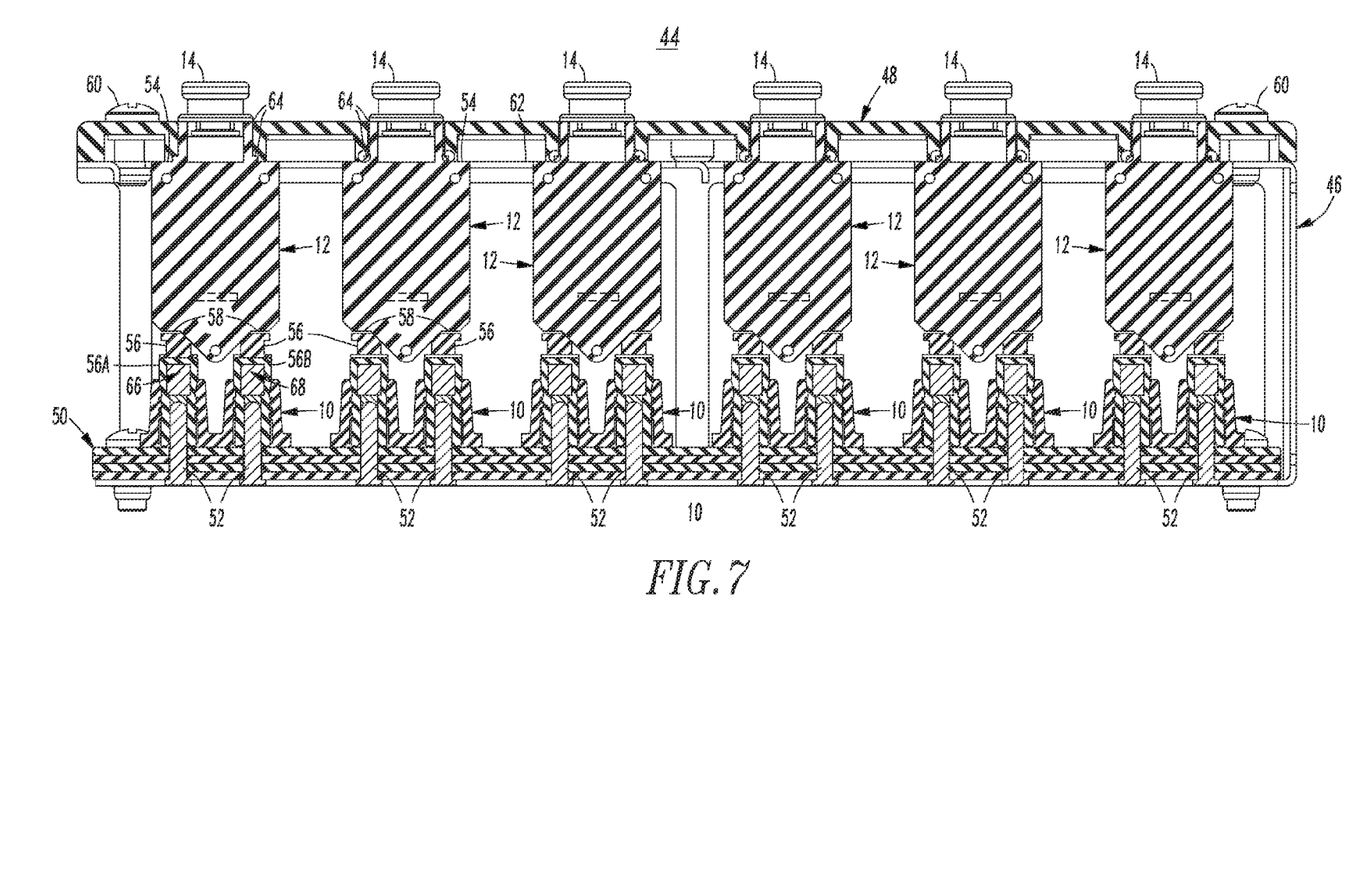
FIG. 7 is a cross-sectional view of a circuit breaker assembly in accordance with another embodiment of the disclosed concept.

FIG. 7 shows another circuit breaker assembly, such as the example circuit breaker panel 44. The circuit breaker panel 44 can be the same as or similar to the circuit breaker panel 2 of FIG. 1 except that the example keeper layer 34 is not employed, and can be the same as or similar to the circuit breaker panel 36 of FIGS. 5 and 6 except that a housing 46 including a cover member, such as the example cover or faceplate 48, is shown. The circuit breaker panel 44 includes the housing 46, an electrical bus structure, such as a multi-layer backplane 50, a number of first plug-in members 52 coupled to the backplane 50, a plurality of the insulative retainers 10 coupled to the backplane 50, and a plurality of the plug-in circuit breakers 12. Each of the circuit breakers 12 includes the manual operator 14 disposed from a first surface 54 and a number of second plug-in members, such as the two example sockets 56, disposed from a second surface 58 opposite the first surface 54. The example sockets 56 electrically engage a number of the number of first plug-in members 52.

The cover or faceplate 48 is removably coupled to the housing 46 by fasteners 60. The cover or faceplate 48 has a surface 62 and a plurality of apertures 64 disposed therethrough. The first surface 54 of the circuit breakers 12 engages the surface 62 of the cover or faceplate 48. Each of the manual operators 14 passes through a corresponding one of the apertures 64.

EXAMPLE 12

The insulative retainers 10 are structured to retain the circuit breakers 12 with the manual operators 14 generally facing downward (e.g. upward with respect to FIG. 7) when the cover or faceplate 48 is removed from the housing 46.

EXAMPLE 13

The cover or faceplate 48 includes the fasteners 60 removably engaging the housing 46.

EXAMPLE 14

The number of second plug-in members, such as the two example sockets 56, include a first socket 56A for a line terminal 66 and a second socket 56B for a load terminal 68.

EXAMPLE 15

The manual operator 14 is a push-pull operating handle.

EXAMPLE 16

Figure 8:
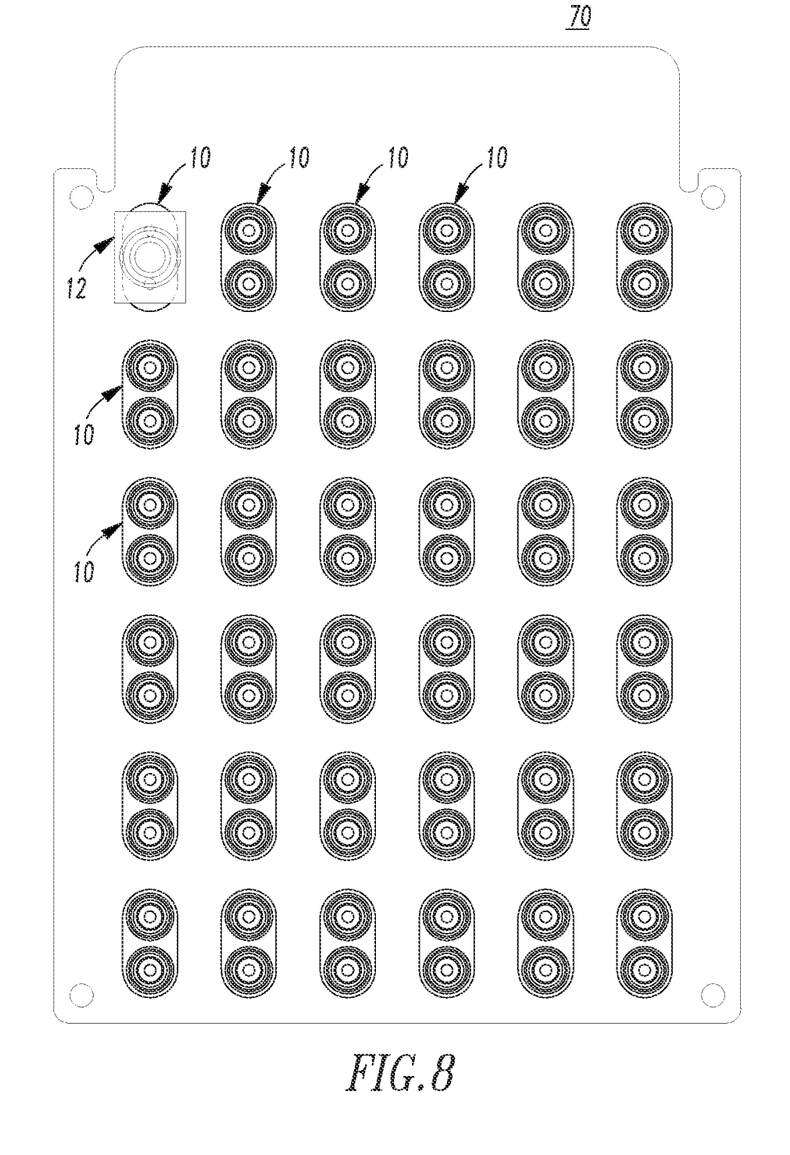
FIG. 8 is a plan view of a circuit breaker assembly in accordance with another embodiment of the disclosed concept.

FIG. 8 shows another circuit breaker assembly, such as the example circuit breaker panel 70 including one installed circuit breaker 12. The circuit breaker panel 70 can be the same as or similar to the circuit breaker panel 2 of FIG. 1 except that the example keeper layer 34 is not employed, can be the same as or similar to the circuit breaker panel 36 of FIGS. 5 and 6, or can be the same as or similar to the circuit breaker panel 44 of FIG. 7 except that the housing 46 and cover or faceplate 48 are not shown.

The disclosed insulative retainers 10 provide electrical insulation between conductors, such as the pins 8. The electrical insulation is improved by increasing the distance of a potential arc path (e.g., which is made longer than that of a flat surface), protecting against foreign objects that might cause electrical shorts from line to load, and protecting unused pins 8 from other conductors.

The disclosed insulative retainer 10 protects the backplane pins 8 from damage and the user from energized electrical conductors in unused positions. The backplane pins 8 are below the retainer surface when the corresponding circuit breaker 12 is not populated. If a user installs a circuit breaker with the power on, then the insulative retainer 10 provides added electrical protection from accidental shock.

The disclosed concept overcomes limitations of known plug-in circuit breaker panels for applications such as, for example and without limitation: (1) severe vibration applications by providing additional dampening; (2) severe corrosion, humidity, elevation, wet areas and non-pressurized use by providing a moisture barrier; (3) overhead (suspended) applications that require retention of circuit breakers when removing a cover or faceplate; and (4) those applications needing relatively higher dielectric withstand voltages between conductors (e.g., 270 VDC).

The disclosed silicone rubber retainer 10 provides the following characteristics: (1) retention of circuit breakers without a circuit breaker panel cover or faceplate being installed; (2) protection of unused pins from damage; (3) protection of pins from foreign object debris (FOD) conduction between pins; and (4) added protection for the user from accidental shock.

The disclosed insulative retainers 10 provide vibration dampening. By adding compression of the circuit breaker sockets 16 as installed in the circuit breaker panels 2,36,44,70 this prevents relative motion that can cause fretting of contacts, which could cause heating and eventually an open circuit.

The disclosed insulative retainers 10 also provide a relatively tight fit around the circuit breaker embedded sockets 16 and seal the electrical contact interface. This prevents moisture pooling, salt build-up and icing. This also limits corrosion on the mating pins 8 and the embedded sockets 16.

The disclosed insulative retainers 10 further protect against FOD. Conventional circuit breaker panels in pressurized areas and non-pressurized areas are susceptible to debris build-up (e.g., without limitation, sand, dust, salt and loose hardware, such as pieces of wire, nuts or washers). Protecting the line and load terminals 18,20 of the circuit breakers 12 will increase application safety and reliability.

The disclosed insulative retainers 10 also allow overhead circuit breaker assemblies. The retainers 10 hold the circuit breakers 12 in place when maintenance is being conducted, for example, to add or replace a circuit breaker with the cover or faceplate 48 removed.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:
1. A circuit breaker assembly comprising:
a housing;
an electrical bus structure within said housing;
a number of first plug-in members coupled to said electrical bus structure;
a number of insulative retainers coupled to said electrical bus structure, a corresponding one of said number of insulative retainers being operatively associated with a corresponding number of said number of first plug-in members; and
a number of circuit breakers, each of said number of circuit breakers comprising a manual operator and a number of second plug-in members disposed opposite said manual operator, each of the number of second plug-in members electrically engaging a corresponding one of said number of first plug-in members,
wherein the corresponding one of said number of insulative retainers is disposed about the corresponding number of said number of first plug-in members, in order: (i) to insulate said corresponding number of said number of first plug-in members, and (ii) to retain the number of second plug-in members that electrically engage the corresponding number of said number of first plug-in members, and
wherein said number of insulative retainers is structured to retain said number of circuit breakers with said manual operator generally facing downward when a cover member is removed from said housing.

2. The circuit breaker assembly of claim 1 wherein the corresponding one of said number of insulative retainers is structured to protect the corresponding number of said number of first plug-in members when not electrically engaging the number of second plug-in members.

3. The circuit breaker assembly of claim 1 wherein said number of first plug-in members is a plurality of male terminals; wherein the number of second plug-in members is a plurality of female sockets; and wherein each of said number of insulative retainers is operatively associated with said plurality of male terminals and said plurality of female sockets.

4. The circuit breaker assembly of claim 3 wherein said plurality of male terminals is two male terminals; wherein said plurality of female sockets is two female sockets; wherein said each of said number of insulative retainers comprises, for each one of said two male terminals and each corresponding one of said two female sockets, an insulator comprising a base and an elongated portion extending from the base, said base having a first aperture therein, said elongated portion having a second aperture therein and a conduit extending therethrough from the first aperture to the second aperture; wherein said each one of said two male terminals extends through the first aperture and partially through the conduit; wherein said each corresponding one of said two female sockets extends through the second aperture and partially through the conduit; and wherein said each one of said two male terminals electrically engages said each corresponding one of said two female sockets within the conduit.

5. The circuit breaker assembly of claim 4 wherein the conduit has a generally cylindrical shape and comprises a plurality of internal ridges; and wherein said each corresponding one of said two female sockets has a cylindrical shape within the generally cylindrical shape of the conduit and is engaged by said internal ridges therein.

6. The circuit breaker assembly of claim 1 wherein each of said number of insulative retainers is made from the group consisting of liquid silicone rubber, thermoplastic elastomer, and transfer rubber molding.

7. The circuit breaker assembly of claim 1 wherein said number of first plug-in members is a number of male terminals, said number of first plug-in members is equal to said number of male terminals; wherein the number of second plug-in members is a number of female sockets, said number of second plug-in members is equal to said number of female sockets; wherein each of said number of insulative retainers comprises, for each one of said number of male terminals and each corresponding one of said number of female sockets, an insulator comprising a base and an elongated portion extending from the base, said base having a first aperture therein, said elongated portion having a second aperture therein and a conduit extending therethrough from the first aperture to the second aperture; and wherein said each one of said number of male terminals extends through the first aperture and only partially through the conduit.

8. The circuit breaker assembly of claim 1 wherein said number of first plug-in members is a number of pins, said number of first plug-in members is equal to said number of pins; wherein each of said number of insulative retainers is made of a liquid silicone rubber and comprises, for each one of said number of pins, an insulator comprising a base and an elongated portion extending from the base, said base having a first aperture therein, said elongated portion having a second aperture therein and a conduit extending therethrough from the first aperture to the second aperture; and wherein said each one of said number of pins extends through the first aperture and into the conduit.

9. The circuit breaker assembly of claim 1 wherein said number of first plug-in members is a number of male terminals, said number of first plug-in members is equal to said number of male terminals; wherein the number of second plug-in members is a number of female sockets, said number of second plug-in members is equal to said number of female sockets; wherein each of said number of insulative retainers comprises, for a subset of said number of male terminals and a subset of said number of female sockets, an insulator comprising a base and an elongated portion extending from the base, said base having a first aperture therein, said elongated portion having a second aperture therein and a conduit extending therethrough from the first aperture to the second aperture; wherein the conduit has a generally cylindrical shape and comprises a plurality of internal ridges; and wherein a corresponding one of said subset of said number of female sockets has a cylindrical shape within the generally cylindrical shape of the conduit and is engaged by said internal ridges therein.

10. The circuit breaker assembly of claim 1 wherein each of said number of insulative retainers comprises a base disposed on a planar surface of said electrical bus structure; and wherein each of said number of insulative retainers is coupled to said electrical bus structure by a keeper layer engaging the base, said keeper layer being coupled to the planar surface of said electrical bus structure.

11. The circuit breaker assembly of claim 1 wherein said number of insulative retainers are coupled to said electrical bus structure by an adhesive.

12. A circuit breaker assembly comprising:
a housing;
an electrical bus structure within said housing;
a number of first plug-in members coupled to said electrical bus structure;
a number of insulative retainers coupled to said electrical bus structure, a corresponding one of said number of insulative retainers being operatively associated with a corresponding number of said number of first plug-in members;
a number of circuit breakers, each of said number of circuit breakers comprising a manual operator disposed from a first surface and a number of second plug-in members disposed from a second surface opposite the first surface, each of the number of second plug-in members electrically engaging a corresponding one of said number of first plug-in members; and
a cover member removably coupled to said housing, said cover member comprising a third surface and a number of apertures disposed through the third surface;
wherein the corresponding one of said number of insulative retainers is disposed about the corresponding number of said number of first plug-in members, in order: (i) to insulate said corresponding number of said number of first plug-in members, and (ii) to retain the number of second plug-in members that electrically engage the corresponding number of said number of first plug-in members,
wherein the first surface of said number of circuit breakers engages the third surface of said cover member,
wherein said manual operator passes through a corresponding one of said number of apertures, and
wherein said number of insulative retainers is structured to retain said number of circuit breakers with said manual operator generally facing downward when said cover member is removed from said housing.

13. The circuit breaker assembly of claim 12 wherein each of said number of insulative retainers is made from the group consisting of liquid silicone rubber, thermoplastic elastomer, and transfer rubber molding.

14. The circuit breaker assembly of claim 12 wherein said number of first plug-in members is a number of male terminals, said number of first plug-in members is equal to said number of male terminals; wherein the number of second plug-in members is a number of female sockets, said number of second plug-in members is equal to said number of female sockets; wherein each of said number of insulative retainers comprises, for each one of said number of male terminals and each corresponding one of said number of female sockets, an insulator comprising a base and an elongated portion extending from the base, said base having a first aperture therein, said elongated portion having a second aperture therein and a conduit extending therethrough from the first aperture to the second aperture; and wherein said each one of said number of male terminals extends through the first aperture and only partially through the conduit.

15. The circuit breaker assembly of claim 12 wherein said number of first plug-in members is a number of pins, said number of first plug-in members is equal to said number of pins; wherein each of said number of insulative retainers is made of a liquid silicone rubber and comprises, for each one of said number of pins, an insulator comprising a base and an elongated portion extending from the base, said base having a first aperture therein, said elongated portion having a second aperture therein and a conduit extending therethrough from the first aperture to the second aperture; and wherein said each one of said number of pins extends through the first aperture and into the conduit.

16. The circuit breaker assembly of claim 12 wherein said number of first plug-in members is a number of male terminals, said number of first plug-in members is equal to said number of male terminals; wherein the number of second plug-in members is a number of female sockets, said number of second plug-in members is equal to said number of female sockets; wherein each of said number of insulative retainers comprises, for a subset of said number of male terminals and a subset of said number of female sockets, an insulator comprising a base and an elongated portion extending from the base, said base having a first aperture therein, said elongated portion having a second aperture therein and a conduit extending therethrough from the first aperture to the second aperture; wherein the conduit has a generally cylindrical shape and comprises a plurality of internal ridges; and wherein a corresponding one of said number of said subset of female sockets has a cylindrical shape within the generally cylindrical shape of the conduit and is engaged by said internal ridges therein.

17. The circuit breaker assembly of claim 12 wherein each of said number of insulative retainers comprises a base disposed on a planar surface of said electrical bus structure; and wherein each of said number of insulative retainers is coupled to said electrical bus structure by a keeper layer engaging the base, said keeper layer being coupled to the planar surface of said electrical bus structure.

18. The circuit breaker assembly of claim 12 wherein the number of second plug-in members comprises a first socket for a line terminal and a second socket for a load terminal.

19. The circuit breaker assembly of claim 12 wherein said cover member comprises a fastener removably engaging said housing.

20. The circuit breaker assembly of claim 12 wherein said manual operator is a push-pull operating handle.

21. A circuit breaker assembly comprising:
a housing;
an electrical bus structure within said housing;
a number of first plug-in members coupled to said electrical bus structure;
a number of insulative retainers coupled to said electrical bus structure, a corresponding one of said number of insulative retainers being operatively associated with a corresponding number of said number of first plug-in members; and
a number of circuit breakers, each of said number of circuit breakers comprising a manual operator and a number of second plug-in members disposed opposite said manual operator, each of the number of second plug-in members electrically engaging a corresponding one of said number of first plug-in members,
wherein the corresponding one of said number of insulative retainers is disposed about the corresponding number of said number of first plug-in members, in order: (i) to insulate said corresponding number of said number of first plug-in members, and (ii) to retain the number of second plug-in members that electrically engage the corresponding number of said number of first plug-in members,
wherein each of said number of insulative retainers comprises a base disposed on a planar surface of said electrical bus structure, and
wherein each of said number of insulative retainers is coupled to said electrical bus structure by a keeper layer engaging the base, said keeper layer being coupled to the planar surface of said electrical bus structure.

* * * * *